US010223866B2

(12) United States Patent
Warner et al.

(10) Patent No.: US 10,223,866 B2
(45) Date of Patent: Mar. 5, 2019

(54) ELECTRONIC TRANSACTION SYSTEMS AND METHODS FOR GAMING OR AMUSEMENT CREDIT PURCHASES

(71) Applicant: AUTOMATED CASHLESS SYSTEMS, INC., Reno, NV (US)

(72) Inventors: Stephen Warner, Zephyr Cove, NV (US); Michael Sackrison, Reno, NV (US); Michael Daly, Las Vegas, NV (US)

(73) Assignee: Automated Cashless Systems, Inc., Reno, NV (US)

( * ) Notice: Subject to any disclaimer, the term of this patent is extended or adjusted under 35 U.S.C. 154(b) by 0 days.

(21) Appl. No.: 14/608,138

(22) Filed: Jan. 28, 2015

(65) Prior Publication Data

US 2015/0187177 A1    Jul. 2, 2015

Related U.S. Application Data

(63) Continuation-in-part of application No. 14/210,450, filed on Mar. 14, 2014, now Pat. No. 8,979,643, (Continued)

(51) Int. Cl.
*G07F 17/32* (2006.01)
*G06Q 20/02* (2012.01)
(Continued)

(52) U.S. Cl.
CPC ....... *G07F 17/3244* (2013.01); *G06Q 20/027* (2013.01); *G06Q 20/10* (2013.01); (Continued)

(58) Field of Classification Search
CPC .. G06Q 20/027; G06Q 20/1085; G06Q 20/18; G06Q 20/204; G06Q 20/206; G07F 17/32; G07F 19/20
(Continued)

(56) References Cited

U.S. PATENT DOCUMENTS 5,557,086 A    9/1996   Schulze et al.
6,251,014 B1   6/2001   Stockdale et al.
(Continued)

FOREIGN PATENT DOCUMENTS

GB          2461975 A       10/2010
KR    20-0291099000         10/2002
(Continued)

OTHER PUBLICATIONS

ISA/KR; Search Report/Written Opinion for PCT/US2015/013365 dated May 21, 2015, 17 pages.
(Continued)

*Primary Examiner* — Michael Cuff
(74) *Attorney, Agent, or Firm* — Michael A. Kerr; Kerr IP Group, LLC

(57) ABSTRACT

Systems, and methods are provided for the electronic purchase of gaming or amusement credits using a transaction device at a patron's location to apply funds from a financial account to the purchase of credits for use with an amusement or gaming device, system, or point of other wagering activity. Such credits are provided at the patron's location in the form of a printed ticket or other physical indicia of equivalent value, credits appearing in the credit meter and on the display of a gaming device, credit issued to a player card confirmed at the patron's location, credit issued to a debit card confirmed at the patron's location, and/or cash or other monetary-equivalents. In addition, physical confirmation of the completed electronic transaction from the patron's financial account may be concurrently provided to the patron in the form of a receipt.

18 Claims, 6 Drawing Sheets

Related U.S. Application Data which is a continuation of application No. 13/156,444, filed on Jun. 9, 2011, now Pat. No. 8,715,066.

(60) Provisional application No. 61/354,339, filed on Jun. 14, 2010, provisional application No. 61/932,777, filed on Jan. 28, 2014.

(51) Int. Cl.
*G06Q 20/10* (2012.01)
*G06Q 40/02* (2012.01)
*G06Q 50/34* (2012.01)

(52) U.S. Cl.
CPC ............ *G06Q 40/02* (2013.01); *G06Q 50/34* (2013.01); *G07F 17/3248* (2013.01)

(58) Field of Classification Search
USPC .............................................. 463/25, 29, 42
See application file for complete search history.

(56) References Cited

U.S. PATENT DOCUMENTS

| | | |
|---|---|---|
| 6,304,860 B1 | 10/2001 | Martin et al. |
| 6,511,377 B1 | 1/2003 | Weiss |
| 6,547,131 B1 | 4/2003 | Foodman et al. |
| 6,645,077 B2 | 11/2003 | Rowe |
| 6,793,134 B2 | 9/2004 | Clark |
| 6,866,586 B2 | 3/2005 | Oberberger et al. |
| 6,890,258 B2 | 5/2005 | Weiss |
| 6,997,807 B2 | 2/2006 | Weiss |
| 7,004,837 B1 | 2/2006 | Crowder et al. |
| 7,137,889 B1 | 11/2006 | Luciano |
| 7,217,190 B2 | 5/2007 | Weiss |
| 7,232,371 B2 | 6/2007 | Gatto et al. |
| 7,625,279 B1 | 12/2009 | Luciano et al. |
| 7,780,526 B2 | 8/2010 | Nguyen |
| 7,819,742 B2 | 10/2010 | Chamberlain et al. |
| 7,828,647 B1 | 11/2010 | Luciano |
| 7,844,255 B2 | 11/2010 | Petrov et al. |
| 7,857,207 B1* | 12/2010 | Hopkins, III ............ G07F 19/20 221/9 |
| 8,715,066 B2 | 5/2014 | Prather et al. |
| 8,968,075 B2 | 3/2015 | Warner |
| 8,979,642 B2 | 3/2015 | Warner |
| 8,979,643 B2 | 3/2015 | Warner |
| 8,979,644 B2 | 3/2015 | Warner |
| 2002/0032656 A1 | 3/2002 | Chen |
| 2003/0003996 A1 | 1/2003 | Nguyen et al. |
| 2003/0073494 A1 | 4/2003 | Kalpakian et al. |
| 2003/0083127 A1 | 5/2003 | Weiss |
| 2003/0087692 A1 | 5/2003 | Weiss |
| 2003/0145205 A1 | 7/2003 | Sarcanin |
| 2003/0228898 A1 | 12/2003 | Rowe |
| 2004/0087360 A1 | 5/2004 | Chamberlain et al. |
| 2004/0093309 A1 | 5/2004 | Nakamura et al. |
| 2004/0147309 A1 | 7/2004 | Chamberlain et al. |
| 2004/0253979 A1 | 12/2004 | Burr |
| 2005/0090308 A1 | 4/2005 | Weiss |
| 2005/0097017 A1 | 5/2005 | Hanratty |
| 2005/0107155 A1 | 5/2005 | Potts et al. |
| 2005/0107156 A1 | 5/2005 | Potts et al. |
| 2005/0266919 A1 | 12/2005 | Rowe et al. |
| 2006/0160610 A1 | 7/2006 | Potts |
| 2006/0172798 A1 | 8/2006 | Crowder et al. |
| 2006/0205481 A1 | 9/2006 | Dominelli |
| 2006/0218091 A1 | 9/2006 | Choy |
| 2007/0225068 A1 | 9/2007 | Weiss |
| 2007/0246531 A1 | 10/2007 | Dabrowski |
| 2007/0282858 A1 | 12/2007 | Arner et al. |
| 2008/0015014 A1 | 1/2008 | Weiss |
| 2008/0113776 A1 | 5/2008 | Sommer |
| 2008/0119284 A1 | 5/2008 | Luciano et al. |
| 2008/0139303 A1 | 6/2008 | Patterson |
| 2008/0153583 A1 | 6/2008 | Huntley et al. |
| 2008/0242403 A1 | 10/2008 | Weiss |
| 2009/0005157 A1 | 1/2009 | Netley et al. |
| 2009/0005159 A1 | 1/2009 | Netley et al. |
| 2009/0099965 A1 | 4/2009 | Grant, IV |
| 2009/0131146 A1 | 5/2009 | Arezina et al. |
| 2009/0138369 A1 | 5/2009 | Raja |
| 2009/0287524 A1 | 11/2009 | Gnoato |
| 2009/0299848 A1 | 12/2009 | Cao et al. |
| 2009/0305765 A1 | 12/2009 | Walker et al. |
| 2010/0130284 A1 | 5/2010 | Luciano et al. |
| 2010/0197383 A1 | 8/2010 | Rader et al. |
| 2010/0222132 A1 | 9/2010 | Sanford et al. |
| 2011/0086696 A1* | 4/2011 | MacEwan ............... G07F 17/32 463/25 |
| 2011/0230260 A1 | 9/2011 | Morrow et al. |
| 2012/0100908 A1 | 4/2012 | Wells et al. |
| 2012/0142403 A1 | 6/2012 | Prattler |
| 2012/0144461 A1* | 6/2012 | Rathbun ............... H04L 9/3213 726/5 |
| 2013/0172078 A1 | 7/2013 | Boyd et al. |
| 2014/0025200 A1 | 1/2014 | Smith |
| 2014/0094256 A1 | 4/2014 | Hilbert et al. |
| 2014/0194193 A1 | 7/2014 | Warner et al. |
| 2014/0194194 A1 | 7/2014 | Warner |
| 2014/0194195 A1 | 7/2014 | Warner et al. |
| 2014/0200073 A1 | 7/2014 | Warner et al. |
| 2015/0187177 A1 | 4/2015 | Warner et al. |
| 2015/0145120 A1 | 5/2015 | Lee |
| 2015/0148120 A1 | 5/2015 | Warner et al. |
| 2015/0339654 A1 | 9/2015 | Warner et al. |
| 2016/0007622 A1 | 1/2016 | Bowyer |
| 2016/0027252 A1 | 1/2016 | Warner et al. |

FOREIGN PATENT DOCUMENTS

| | | |
|---|---|---|
| KR | 10-2006-0049945 | 5/2006 |
| WO | 1996034345 A1 | 10/1996 |

OTHER PUBLICATIONS

ISA/US; Search Report/Written Opinion for PCT/US2015/030438 dated Aug. 12, 2015, 6 pages.
ISA/US; Search Report/Written Opinion for PCT/US2015/052738 dated Jan. 4, 2016, 11 pages.

* cited by examiner

ELECTRONIC TRANSACTION SYSTEMS AND METHODS FOR GAMING OR AMUSEMENT CREDIT PURCHASES

RELATED APPLICATIONS

This application is a Continuation-in-Part of pending U.S. patent application Ser. No. 14/210,450, filed on Mar. 14, 2014 entitled "Systems and Methods for Electronic Fund Transfers for Use with Gaming Systems", which was a Continuation that claimed benefit of U.S. patent application Ser. No. 13/156,444 (now U.S. Pat. No. 8,715,066), filed on Jun. 9, 2011 and entitled "System and Method for Electronic Fund Transfers for Use with Gaming Systems", which in turn claimed benefit of U.S. Provisional Patent Application No. 61/354,339, filed on Jun. 14, 2010 and entitled "System and Method for Wireless Electronic Fund Transfers for Use With Gaming Systems". This application also claims benefit of U.S. Provisional Patent Application No. 61/932,777, filed on Jan. 28, 2014 and entitled "System and Methods for Electronic Fund Transfers for in Gaming Environments". The instant application is commonly owned with and incorporates herein by reference in their entireties for all useful purposes, all four of applications enumerated above (Ser. Nos. 14/210,450, 13/156,444, 61/354,339, and 61/932,777). Further, this application also incorporates herein by reference in their entireties for all useful purposes the commonly owned and assigned pending applications each entitled "Systems and Methods for Electronic Fund Transfers for Use with Gaming Systems" identified by U.S. application Ser. Nos. 14/210,445, 14/210,453, and 14/210,456. In the event of inconsistency between anything stated in this specification and anything incorporated by reference in this specification, this specification shall govern.

FIELD OF THE INVENTION

The present invention relates to systems and methods for the electronic purchase of gaming or amusement credits, and in particular to the purchase of gaming credits for use with table-based casino games.

BACKGROUND OF THE INVENTION

Currently, the primary method of transferring funds into gaming devices and systems is through cash or tickets such as "monetary value" or ticket-in/ticket-out (TITO) tickets. In addition, funds may be transferred into gaming and amusement devices and systems via cash in the form of paper currency or coins, "monetary value cards", game tokens, or coupons. The funds are usually converted into gaming or amusement credits through a cash acceptance device, such as a coin acceptor, bill acceptor, or card reader associated with the gaming device. Gaming or amusement credits on a gaming machine may be exported onto monetary value tickets or a value onto a card to be used in a gaming or amusement facility. At the direction of the patron, the gaming or amusement credits can be redeemed and converted back into cash. A ticketing system or a value card system is used to read the tickets, print tickets, and write onto the value card the amount to be cashed out at an external kiosk or cashier station.

The gaming or amusement device system normally contains a cash acceptance device, usually referred to as a bill acceptor, to convert cash into game play credits for use on the machine. It may also contain a loyalty card system and/or a ticketing system that includes a ticket reader and a ticket printer to read tickets with game play credit and to print tickets when the patron is ready to cash out such that the value remaining in the gaming or amusement device can be printed on the ticket with a special barcode or system recognizable code for use in another machine or can be redeemed for cash with a cashier or attendant in the specific gaming or amusement facility. Normally, credit is issued on the gaming or amusement device when cash is inserted into the device, or when a ticket with value on it is read by the device, or when a loyalty card is read which can provide free play, thus allowing the patron to play the game. If a patron is playing on a gaming device and runs out of credit and has no more cash to put into the gaming or amusement device, the patron is forced to leave the gaming or amusement device, find an ATM cash machine, kiosk, or cashier station, withdraw cash, and then return to the gaming or amusement device.

Card and/or ticket systems are also used in connection with gaming or amusement machines in environments where the gaming or amusement machines issue and accept cards and/or tickets in lieu of money. Such systems provide a workable cashless system on a local or multi-property level. The casino operator's system redeems an amount of money from the card system for the assigned card and/or from the value imprinted on the ticket through visual or other optical inspection or via a ticket validation system. Card and/or ticketing systems are advantageous because they reduce the amount of cash transactions and the need for the patron to transport and hold large amounts of cash or coins. Consequently, ticketing systems have become common in most gaming and amusement jurisdictions and the applicable hardware is manufactured and supplied as peripheral devices by various manufacturers. Systems in ticket-based gaming environments require each machine to have one or more dedicated devices to read and write cards, tickets, and/or similar physical indicia of game play credit.

The role of card reader devices and/or ticketing machines has recently been expanded to enable patrons to redeem the card value and/or ticket at a gaming or amusement device. As before, the card and/or ticketing system issues cash-out card credit to the card system and/or a monetary-equivalent ticket in response to a patron's cash-out request. In the expanded role, the cash-out card and/or ticket includes information that enables the patron to present the card and/or ticket to a cashier or redemption machine or kiosk. The patron may also re-insert the card and/or ticket into a gaming or amusement device configured to accept card and/or ticket transactions.

In this expanded role, the card and/or ticket accepting gaming or amusement devices must now contain a card and/or ticket reader as well as the card system communication and/or ticket printer. In the expanded system, the cash-out card communicates with a local card system which tracks date and time of cash-out credits for the identification card and the ticket typically contains a barcode, a written ticket amount, the time and date of printing, a numerical representation of the barcode and other identification and validation information specific to the property. To redeem the card and/or ticket for its monetary or non-monetary value, the patron either presents the card and/or ticket to the operator who validates the card and/or ticket and pays the patron an amount of money or prizes, or the patron inserts the card and/or ticket into a card and/or ticket-ready gaming or amusement device, whereby the gaming or amusement device provides the patron with a number of credits equal to the amount represented by or encoded in the card system or on the ticket. It is important to note that these prior art systems rely on physical indicia that are required to be generated (such as by printing by conventional print processes using appropriate electromechanical machines) and required to be read for validation purposes (such as by an electromechanical device including ticket readers, bill acceptors, or the like) in order for the system to function properly. Tickets in these prior art systems cannot be generated, read, or validated by human personnel alone. Humans are not capable of generating tickets of the type known in the prior art without the assistance of specialized electromechanical printing devices. Further, and even when a conventional gaming ticket is presented by a patron to a human cashier, dealer, or other authorized personnel for redemption, the ticket must still be inserted into an appropriate electromechanical redemption device to be read and validated. Further, an inherent characteristic of prior art ticketing systems is that the machine-generated tickets are negotiable and serve as indicia of credit or monetary value that is redeemable by or payable to the bearer upon demand, in some instances subject to criteria including but not limited to ticket expiration dates, reported cases of lost or stolen tickets, and the like.

The controllers of the card and/or ticket-ready gaming devices are adapted to coordinate with the card and/or ticket validation system. For example, when a payout is issued the card and/or ticket is inserted into a card and/or ticket reader equipped in a gaming or amusement device, the ticket reader forwards information, which can be stored on a barcode in the instance of tickets, to the game's or amusement's controller. The game or amusement device controller recognizes this information as card and/or ticket information and forwards the card and/or ticket information to a card and/or ticket validation system external to the gaming or amusement device. The card and/or ticket validation system analyzes the card and/or ticket information, and if the card and/or ticket is valid, the card and/or ticket validation system provides the game or amusement controller with an authorization to credit the gaming machine with the amount represented by the credits in the card system or represented by encoded value on the ticket.

Alternatively, if the card and/or ticket validation system detects that the card and/or ticket is not valid, the card and/or ticket validation system instructs the game or amusement controller to reject the card and/or ticket. The card and/or ticket validation system may also log the failed attempt in a database that will record the Information for future reference.

Card and/or ticketing benefits each patron, not just those wishing to access funds from or near the gaming and/or amusement device. Gaming and amusement establishments have also become familiar with the card and ticketing systems and their proven performance. Card and ticketing systems are proliferating within the gaming and amusement industry.

Electronic gaming machines either have fixed or variable wager amounts "per play"; that is, each individual wager is set at a certain monetary amount, be it $0.05, $0.25, $1.00, or some other value. This is similar to the concept that different casino chips have different denominations. Some electronic gaming machines permit the patron to change the "per play" value to suit his preference. Most machines also offer patrons the ability to place more than one "per play" wager on the outcome of any particular game. In slot machines, this is usually associated with the addition of additional paylines upon which a winning combination will be paid to the patron, increasing the chances of winning. In video poker, wagering additional per-play credits usually increases the amount of any winnings on a proportional basis. That is, wagering three per-play credits in lieu of just one will result in a winning hand paying a jackpot three times as large. It is common in video poker EGMs for a patron to become eligible for additional bonus awards and/or jackpot payouts when the maximum number of paylines are played. This often involves wagering more than one per-play credit for the play of one game.

A gaming device or system accepts cash or monetary-equivalent funds from a patron, holds the funds in the form of game play credits, represented by an equivalent monetary value, while the patron plays at the gaming or amusement device, and enables the patron to retrieve his unused game play credits at any time. Gaming and amusement devices provide a mechanism by which the patron can input and maintain a pool of money (i.e., credits) or amusement credits of non-monetary value in the gaming or amusement device to play many games of the gaming or amusement device.

By retaining a pool of game credits, gaming and amusement devices do not require the patron to input a wagerable or playable amount of money in the gaming or amusement device prior to each play. When the patron wins, the gaming or amusement devices adds the credits won to the patron's prior credits on the machine so the gaming or amusement device accumulates and stores the patron's winnings. When the patron wishes to stop playing, the gaming or amusement devices provide a mechanism by which the patron can retrieve the monetary or non-monetary value credits that remain in the pool.

In present gaming environments where transfer of funds to enable game play is expected to be seamless, the gaming or amusement device is required to have the ability in real-time to send and receive information pertaining to the patron, game content, game outcomes, and/or any number of other aspects of its normal operation, accept, validate, and process an amount of cash or monetary-equivalent credits that have been applied to the machine, convert any cash input to the machine into the proper amount of game or amusement credits, deduct the appropriate credits from the patron's credit balance for each game play, conduct the game, add or subtract an amount of credits that the patron wins or loses during game play, and effect an appropriate and accurate cash-out when the patron desires by converting remaining game play credits into cash or monetary-equivalent physical or electronic form for transfer as the patron directs. Usually, the gaming device's processor and memory systems provide these various functions in addition to various accounting and machine security functions.

The systems and management of table games in gaming environments differ from those used with gaming devices and/or electronic gaming machines ("EGMs"). EGMs are designed for unattended use by a patron and must therefore provide all of the services necessary to support game play, including acceptance of wagers, processing of input from the patron during play of the game, local determination and display of game outcomes or display of outcomes provided by a central determination system operatively connected to the EGM, recognition of a winning outcome, calculation and payment of any winnings to the patron, and support for ancillary functions including the acceptance of cash or other game play credit, printing dispensing of tickets, and the like. Most table games require the presence of one or more casino personnel to administer the game and provide the required ancillary functions. For example, while an EGM configured to provide video poker game will electronically randomize the card deck, deal, and display the patron's hand, an actual live poker game requires a dealer to shuffle and deal the cards. Similarly, where the EGM is configured to determine winning hands and to calculate and dispense any winnings, the live dealer table version of the same game requires a dealer to inspect the cards, determine outcomes, calculate any winnings, and pay the appropriate amounts.

Present live table game stations do not typically include the bill acceptors, ticket readers, and ticket printers now ubiquitous in modern EGMs. Instead, dealers at live table games receive cash and credit vouchers from patrons and dispense gaming chips for use on their table. Unlike EGMs, table games are often not connected to a networked casino management system ("CMS") capable of exchanging data with a central server for the purpose of exchanging one or more monetary equivalent instruments for gaming chips. A system that would permit dealers of table games in gaming environments to provide patrons with a convenient and secure system for the purchase of gaming chips electronically would be a considerable improvement over the present art.

Obstacles to the use of systems to transfer funds electronically include security and fund transfer confirmation. Many regulatory agencies will not approve funds transfer systems that do not provide physical confirmation in durable form, such as a paper receipt, that an electronic transfer of funds has occurred. Providing a physical record of all such transactions would also improve overall system security and provide suitable means for patrons and casino operators to address any discrepancies that may arise. Accordingly, a system to transfer funds electronically that is suitable for use in a gaming environment or amusement environment would need to provide such evidence to obtain regulatory approval and to provide additional desired transaction security. Due to the absence of wired network access at most gaming tables, a further need exists to provide a system with wireless capability designed to retrieve funds at the patron's direction for efficient conversion into physical credit indicia, such as casino chips, rather than directly into the credit meter of a gaming device as may be preferred with a stand-alone EGM.

A casino patron may access funds in his financial account via an automated teller machine ("ATM") or cash machine. While playing a game, if a patron runs out of cash and needs to access the funds in his bank account, he must stop the play at the gaming or amusement device, find an ATM, extract cash, convert the cash into a monetary equivalent (if necessary), and then return to the gaming or amusement device. If it is still available for play, the patron must then insert the cash or the monetary equivalent into the gaming or amusement device to continue play. Many patrons dislike this interruption in the gaming process due to the inconvenience and possibility of losing access to the gaming device or position to another patron. Once his gaming session is interrupted, the patron may elect not to return to the machine in favor of pursuing a non-gaming activity, thereby causing a loss of potential gaming revenue for the casino operator. There is, therefore, a need for a more convenient way for the patrons to access their funds while playing in a gaming or amusement environment without having to leave their device or position.

An ATM or cash machine operates over an ATM network such as NYCE, PLUS, STAR, or the like to transfer money from the account of a financial institution's customer to the ATM operator's account. The ATM operator or designated agent or representative is responsible for loading a supply of cash in the ATM, for the security of the cash, and for the maintenance of the ATM. Normally an ATM is connected to an ATM network, which may then securely connect to the customers' financial institution and required to access their accounts. Financial institutions and banks have a contractual relationship with the ATM network to transfer money from the customer's financial or bank account to the ATM network. The ATM network then dispenses cash to the customer, usually retaining a fee for their service.

Accordingly, a need exists for a secure and efficient electronic system to purchase credits that is suitable for approval and use in gaming environments and use in amusement environments that eliminates the reliance on stand-alone ATMs or cash machines to obtain cash for use in a gaming environment or in amusement devices at the gaming position. In order to obtain regulatory approval, such system should meet all requirements and performance criteria applicable to conventional ATM systems with respect to accounting for all electronic transactions. Any such transaction system for gaming should not require the conversion of funds from bank accounts into cash which must then be converted into game play credit. For cash management and security purposes, there is also a need for a purchasing process applicable to gaming and amusement devices and systems that does not require a large amount of cash in float in the gaming or amusement devices throughout the gaming or amusement facility. Furthermore, a need exists for a credit purchasing system that utilizes the card and/or ticketing system's hardware and software as much as possible to avoid duplication of such hardware and software. There is also a need for a less costly way for providing funds for gaming and amusement activities.

BRIEF SUMMARY OF THE INVENTION

The present invention provides devices, systems, and methods for the electronic purchase of gaming or amusement credits using a secure transaction device at a patron's location to apply funds from a financial account to the purchase of credits for use with an amusement or gaming device, system, or point of other wagering activity. Such credits are provided at the patron's location in the form of a printed ticket or other physical indicia of equivalent value, credits appearing in the credit meter and on the display of a gaming device, credit issued to a player card confirmed at the patron's location, credit issued to a debit card confirmed at the patron's location, and/or cash or other monetary-equivalents. In addition, physical confirmation of the completed electronic transaction from the patron's financial account may be concurrently provided to the patron in the form of a receipt.

In one embodiment, the electronic transaction system ("ETS") includes an electronic transaction terminal ("ETT") at the patron's location that accepts secure personal identification number("PIN")-based transaction requests to initiate electronic transactions, including but not limited to those described as "point-of-sale" transactions. Said ETT is operatively and securely connected to a secured first computing device that routes said transaction requests to a secured banking network for processing. Further, the secured first computing device communicates the transaction request data and the results received from the secured banking network in response to said transaction request to a secured second computing device with identification of the electronic transaction terminal at which the transaction request originated. If the requested transaction has been approved, the secured first computing device then directs the delivery of game play credit to a credit system at the gaming device, system, or point of other wagering activity associated with the originating electronic transaction terminal. If the requested transaction is not approved, the patron is notified of the outcome and no game play credit is delivered. In either case, the patron may be provided with a physical record of the transaction, in the form of a receipt, from the electronic transaction terminal or the gaming device.

In one embodiment, the ETS may be used to securely transfer funds from the patron's financial account to a prepaid debit card, which debit card may be issued by the casino operator directly or via a third party financial institution on behalf of the casino operator. Such debit cards may be used by the patron just like any Visa card, Master Card, ATM card, or other card at any location that accepts such cards.

In one embodiment, the ETS may be used to securely transfer funds from the patron's financial account to a player's hospitality or loyalty card account issued by the gaming operator. Such player's card accounts permit patrons to use an account in their name that is accessible and available for use at the casino operator's property for expenditures related to gaming, dining, entertainment, shopping, and other purposes. In the case of operators with multiple gaming properties, said accounts may be accessible at all or some of the operator's other co-owned or co-managed properties as well. Player's cards and accounts are intended to encourage loyalty on the part of patrons and provide rewards, bonuses, discounts, and/or other inducements for the patron to return and play at the casino operator's property. An additional advantage of this system for the casino operator is that the activity of patrons with player's cards and accounts may be tracked to determine their patron's gaming and spending activity to permit targeted marketing for each patron and compile statistical information on the operation of the gaming environment.

In one embodiment, the invention features an electronic transaction system for managing and applying electronic funds from a patron's financial account to a credit system for use on an amusement device or a gaming device, system, or in any other wagering activity within a gaming environment. The system comprises a credit system configured to dispense game play credit for the benefit of a patron in physical or electronic form, an electronic transaction terminal, and a secured first computing device communicatively connected to the credit system, the electronic transaction terminal, the patron's financial account via a secured banking network, and a secured second computing device. The secured second computing device is configured to account for and reconcile the transactions. The electronic transaction terminal comprises a secure client-side application for receiving transaction instructions from the patron and means for initiating and transmitting the transaction instructions to the patron's financial institution. The electronic transaction terminal is configured to connect exclusively to the secured first computing device, to initiate communications with the patron's financial institution, and to transmit the transaction instructions to the secured banking network via the secured first computing device.

In one embodiment, the invention features a method for managing and applying electronic funds from a patron's financial account to a credit system in the form of gaming or amusement credits. The method may comprise the following steps. First, providing a credit system configured to dispense credit for the benefit of a patron via physical or electronic credit means. Next, providing an electronic transaction terminal comprising a secure client-side application for receiving instructions from the patron for applying electronic funds from the patron's financial account toward the purchase of gaming or amusement credits via the credit system, and means for transmitting the transaction instructions to the patron's financial account. Next, providing a secured first computing device configured to connect to the patron's financial accounts via a secured banking network. Next, providing a secured second computing device comprising a database, in secured communication with the secured first computing device, and configured to account for and reconcile the transactions. Next, communicatively connecting the electronic transaction terminal to the secured first computing device, communicating with the patron's financial account, and transmitting transaction instructions to purchase credits using electronic funds present in the patron's financial account via the secured first computing device. Finally, transferring electronic funds from the patron's financial account to the credit system via the secured first computing device.

In one embodiment, the invention features a method for managing and applying electronic funds from a patron's financial account to a credit system. The method may comprise the following steps. First, providing an electronic transaction terminal. Next, initiating an application in the electronic transaction terminal via a payment instrument, thereby causing the electronic transaction terminal to send a request to a secured first computing device to connect to an secured banking network of the patron's financial account associated with the payment instrument. Next, checking if the payment instrument is acceptable by the secured first computing device, and if the payment instrument is acceptable, sending a response to the electronic transaction terminal comprising a patron user interface of the financial application associated with the payment instrument. Next, entering a PIN in the patron interface by the patron and sending the entered information to the secured first computing device. Next, sending a request comprising a Global Unique Identifier (GUID) of the financial application associated with the payment instrument, patron's name, patron's financial account, and patron's PIN to a secured banking network server from the secured first computing device. Next, sending the received request from the secured banking network server to a financial server of the patron's financial account. Next, confirming access to the financial application via the secured first computing device to the electronic transaction terminal by the financial server and presenting available electronic transactions to the patron via the patron user interface. Next, selecting a desired electronic transaction by the patron and entering electronic transaction details in patron user interface fields. Next, sending desired electronic transaction details to the financial server via the secured first computing device. Next, processing the selected desired electronic transaction by the financial server and sending electronic transaction confirmation to the secured first computing device. Next, sending electronic transaction confirmation from the secured first computing device to the electronic transaction terminal and to a secured second computing device. Next, applying the electronic funds from the secured first computing device to a credit system and crediting a specific gaming device, printing a ticket, or providing other electronic physical indicia of credit by the credit system. Finally, receiving credits by the patron directly from the credit system or indirectly via authorization from the credit system issued to gaming or amusement personnel, such as a dealer, to dispense credits to the patron and using the credits by the patron in the gaming or amusement environment gaming device or cashing them out.

In one embodiment, patron funds retrieved via the electronic transaction system in a gaming environment may be applied for other uses at the conclusion of the patron's gaming activity. When the patron elects to receive a TITO ticket or other printed voucher upon cash out of remaining game play credits purchased via electronic transaction and/or won during game play, that ticket or voucher may be redeemed for cash at any kiosk, cashier, or other facility provided by the casino operator for that purpose. Similarly, other tangible credit indicia such as casino chips as well as physical data storage media containing electronic credit information including smart cards, secure electronic memories, optical media, and the like may be redeemed for cash via the appropriate device(s) or systems within the gaming environment.

In one embodiment where the patron does not wish to convert game play credits into cash, the monetary-equivalent value of any remaining game play credits may be transferred from physical or electronic form and deposited in a player's hospitality or loyalty card account in the name of the patron and maintained by the casino operator. As described above, most casino operators offer player's hospitality or loyalty card accounts to both encourage patrons to return and to improve their ability to market their facility to patrons. At the patron's direction, any game play credits remaining from previous electronic transaction activity, as well as any additional game play credit won by the patron, may be transferred to a player's hospitality or loyalty card account. In gaming environments, game play credit is typically denominated in dollars and cents rather than in a number of individual plays as may be more common in amusement environments. As such, the value of remaining game play credit in gaming environments is independent of any prior activity and may be easily converted to a monetary-equivalent amount to be deposited into the patron's player's hospitality or loyalty card account for future use. The transfer of these credits may be accomplished at the patron's request entirely within the casino operator's own accounting system without any participation by or involvement with third parties, including the patron's financial institution. Once transferred, the funds would become available for the patron's use for any permissible purpose at the casino operator's facility. Balances in most player's hospitality or loyalty card accounts are accepted for purchase of gaming credits as well as dining, entertainment, purchases at affiliated businesses on or near the property or at other co-owned or co-managed properties, and the like. However, their use is restricted to those businesses and purposes permitted by the casino operator and may be further limited by gaming regulations and/or the Financial Crimes Enforcement Network ("FinCEN").

In one embodiment, the equivalent monetary value of a patron's remaining game play credit purchased via the electronic transaction system and/or won by the patron during game play activity may be transferred from physical indicia or electronic form to a debit card account. Such debit card account may be linked to a MasterCard debit card, Visa debit card, chip-and PIN (EMV) card, or any other debit card issued by the casino operator or a third party debit card issuer/processor on behalf of the casino operator. The balance transferred to said debit card would be available for use by the patron at any establishment that accepts such cards. Further, such debit cards may be recognized by the casino operator as the equivalent of a the player's hospitality or loyalty card for the purposes of determining the gaming, dining, and purchasing preferences of the patron in order to improve the casino operator's ability to market its programs and services to patrons. The availability of universally-accepted debit cards in lieu of more restrictive player's hospitality or loyalty card accounts may encourage more patrons to enroll in such programs to the advantage of both patrons and casino operators.

In one embodiment, the monetary-equivalent value of a patron's remaining game play credit purchased via the electronic transaction system and/or won by the patron during game play activity may be transferred at his direction from physical indicia or electronic form back to the patron's account at the financial institution from which the original transaction originated via a standard payment reversal process available within the particular financial network applicable to such electronic transactions. In one embodiment, the entire remaining game play credit balance is returned in this manner. In one embodiment, an amount of remaining game play credit equal to the amount of the original electronic transaction is returned in this manner. In one embodiment, an amount of remaining game play credit less than the amount of the original electronic transaction is returned in this manner.

In one embodiment, the monetary-equivalent value of a patron's remaining game play credit purchased via the electronic transaction system and/or won by the patron during game play activity may be transferred from physical indicia or electronic form back to the patron's account at the financial institution from which the original transaction originated via an EFT-based direct deposit. In this embodiment, the patron would provide the account information to the casino operator necessary to effect the direct deposit of funds to his account. In one embodiment, the patron's remaining game play funds could be deposited via EFT direct deposit at his direction into a different financial institution account than the account from which the funds originated. In one embodiment, the patron may direct that portions of the remaining monetary-equivalent value of game play credits be directly deposited in different financial institution accounts. The casino operator would be responsible for initiating this direct deposit and such EFT transaction would be completely independent of, and unrelated to, the initial electronic transaction initiated by the patron to purchase game play credits.

In one embodiment, the monetary-equivalent value of a patron's remaining game play credit purchased via the electronic transaction system and/or won by the patron during game play activity may be transferred from physical indicia or electronic form to any account managed or administered by a non-financial institution third party service. Such non-financial institution third party services may include, but are not limited to PayPal, Amazon Payments, Google Wallet, WePay, Skrill, ProPay, and the like. Any non-financial institution third party service that is capable of accepting a deposit and maintaining a balance on behalf of the authorizing patron is envisioned by this embodiment.

In one embodiment, portions of the monetary-equivalent value of a patron's remaining game play credit purchased via the electronic transaction system and/or won by the patron during game play activity may be transferred from physical indicia or electronic form to more than one of the accounts including a player's hospitality or loyalty card account, a debit card account, the patron's original account from which the electronic transaction originated via reversal, the patron's original account from which the electronic transaction originated via direct deposit, any other account to which the patron directs via direct deposit, or any account managed or administered by a third party non-financial institution.

In one embodiment, portions of the monetary-equivalent value of a patron's remaining game play credit purchased via the electronic transaction system and/or won by the patron during game play activity may be transferred from physical indicia or electronic form to more than one of the accounts based on any restrictions imposed on such transfers by gaming regulations. For example, certain gaming jurisdictions may prohibit the conversion of game play credits awarded during game play bonusing or promotional events into monetary equivalents. Under such conditions, only those game play credits purchased or won in compliance with jurisdictional gaming requirements may be transferred to accounts as allowed by said requirements. Any game play credits not eligible for conversion to monetary-equivalent form and transfer to certain accounts may only be transferred to other accounts or forms as permitted by applicable gaming regulations. In most cases, any game play credits not eligible for conversion to monetary-equivalent form may usually be retained by the patron in his player's hospitality or loyalty card account for future play at that property.

Implementations of these and other embodiments of the invention may include one or more of the features described in detail below and elsewhere herein.

The gaming environment may comprise, but is not necessarily limited to, a casino, betting parlor, card room, video lottery establishment, race book, race track, racino, off-track betting facility, or any facility or property which comprises, in whole or in part, any of the above facilities or any activity in which a patron may place a wager on the outcome of an event with the possibility that said outcome may provide a return to the patron of cash or a monetary-equivalent in an amount greater than that of the original wager.

In contrast, an amusement environment comprises any location or facility at which one or more games, either electronic or non-electronic, are available for play upon receipt of game play credit by a patron. Amusement games are distinguished from wagering games in that unlike wagering games, use of an amusement game credit does not represent a wager upon which a cash or a monetary-equivalent return may be provided to a patron based on the outcome of the game. Participants in amusement games may instead receive additional game play credits or non-cash awards, such as prizes or merchandise, based on game outcomes. A further distinction between gaming environments and amusement activities is that gaming activities are highly regulated and permitted only in certain jurisdictions while amusement games, due to their lack of monetary remuneration for patrons, are not subject to the same high degree of regulation, supervision, and enforcement.

The credit system may comprise a gaming device, a device not classified as a gaming device, a computing device or system, a cash dispenser, a coin hopper, a ticket printer, a card writer, a chip dispenser, a smart card writer, a secure memory writer, a optical media writer, any other device or system capable of conveying electronic game play credit to a gaming device, system, or point of other wagering activity, or it may be any other device or system capable of dispensing intangible or tangible and durable physical indicia of game play credit to a patron or authorized gaming or amusement personnel on his behalf. The credit system may comprise one or more means of connection to or communication with an external device or system configured to dispense physical indicia of game play credit to a patron.

The payment instrument may be a payment card, a smart card, a magnetic card, a contactless card, a smartphone, a proximity card, or the like. The payment card may comprise a Visa card, a MasterCard, a chip-and-PIN (EMV) card, an American Express (Amex) card, a Discover card, an ATM card, a prepaid debit card, or the like.

In one embodiment suitable for a table game, the credit system provides an immediate "system redeemed" voucher directly to the dealer or other authorized gaming or amusement personnel instead of providing a conventional ticket to the patron for conversion into gaming chips. Upon generation of the system redeemed voucher, the dealer or other authorized gaming or amusement personnel dispenses the authorized value of gaming chips to the patron and retains the system redeemed voucher for accounting reconciliation purposes. Similarly, in one embodiment, electronic or physical indicia of credit may also be provided to other authorized gaming or amusement personnel for disposition on the patron's behalf at his direction.

Electronic game play credit provided to a patron may be credit applied to a local or remote gaming device, system, or any other wagering activity, credit on a local or remote electronic amusement game, credit to a patron's player card or account, and/or credit to a debit card or debit card account issued by the casino operator or issued on behalf of the casino operator by a third party. The system may further comprise one or more networked or non-networked gaming device(s), system(s), or other wagering activity or activities configured to receive the electronic game play credit for use thereon.

The physical indicia of game play credit may be cash, coins, chips, TITO or other tickets, vouchers, other media containing bar codes, QR codes, or other optical data storage indicia, punch cards, gaming chips, smart cards, secure memory devices, high-capacity optical storage media, or any other tangible and durable form of secure information storage capable of later redemption by the patron. The system may further comprise one or more networked or non-networked gaming device(s), system(s), or other wagering activity or activities configured to receive the physical indicia of game play credit for redemption and use thereon.

The gaming device, system, or other activity within a gaming environment may be a slot machine, video poker machine, kiosk, video lottery terminal, other electronic gaming machine, or any other activity in which an electronic transaction terminal may be suitable for use in a gaming environment proximate to a location where gaming activity may occur, including, but not limited to poker, 21 (blackjack), baccarat, roulette, craps, pai gow, sic bo, keno, bingo or other bingo-based game methods, pan, faro, race and sports book wagering, pari-mutuel betting, and any other game(s) of chance or wagering activities associated with financial transactions.

The amusement device may be any unregulated game, activity, device, or system for which a credit must be applied before game play is allowed and that does not meet the definition of a wager-based gaming activity similar to those in which cash or monetary-equivalent benefit is provided as a possible outcome of the game or activity.

The electronic transaction terminal may comprise any suitable electronic device including but not limited to a device designed specifically for this purpose, a mobile phone, a smartphone, a personal digital assistant (PDA),a payment module, a portable computer, a personal computer, a server, or any other suitable electronic circuit. The electronic transaction terminal may comprise a payment card industry (PCI) and PIN entry device (PED) certified device or a chip-and-PIN (EMV) certified device and may comprise any device, system, component, firmware, or software certified or approved for use in electronic transactions by any jurisdiction or other authority as may be necessary or desirable. The electronic transaction terminal may comprise a central processing unit ("CPU"), one or more static or random access memories, and one or more ports to permit connection of one or more external memory or data storage devices. The electronic transaction terminal may further comprise a point-of-sale (POS) personal identification number (PIN) entry keypad and one or more displays or display devices. The electronic transaction terminal may comprise a card reader suitable for reading cards including payment cards, player's club cards, or the like and may be a smart card reader, a magnetic card reader, an RFID reader, a chip-and-PIN (EMV) card reader, a high-capacity optical storage media reader, a bar code, QR code, or other optical data storage reader, a punch card reader, a contactless card reader, proximity mobile payments reader that enables communication with smart phone devices, a contactless proximity card reader that processes secure smart ticketing and electronic payments using contactless secure mobile commerce technology, or any other device or system which retrieves information stored on or in a payment card or its functional equivalent. The electronic transaction terminal may comprise one or more network connectivity modules for communication using wired, wireless, near-field communications (NFC), other electromagnetic, fiber optic, other optical, or other communication means and/or protocols, including but not limited to Bluetooth, infrared, optical, radio frequency, GPRS, and satellite. Said network communication modules may include one or more ports enabled and associated with the network communication modules. Network connectivity may be achieved by the electronic transaction terminal via any one or combination of several communication modules and communication modes based on operational situations. For example, by way of illustration and not limitation, the electronic transaction terminal may communicate via a wired network using the appropriate wired communication module while the electronic transaction terminal is placed in a wired connectivity cradle equipped with access to a wired network and the appropriate connector(s) to operatively communicate with a wired communication module port. When the electronic transaction terminal is removed from the wired connectivity cradle, the electronic transaction terminal may be switched from a wired communication mode to a wireless communication mode via activation and deactivation of the appropriate communication modules. The switch from wired to wireless communication mode may be performed automatically by software or firmware running on the electronic transaction terminal or performed manually at the direction of a user. Similarly, the electronic transaction terminal may automatically select or be manually instructed to utilize one of several available communication modules and modes to use based on operational factors such as, but not limited to, availability of service, signal strength, security considerations, available bandwidth, link reliability, and the like by activating desired communication module(s) and deactivating others. The electronic transaction terminal wired connectivity cradle may also comprise a wireless access port operatively connected to the wired network and accessible by a wireless communication module in one or more electronic transaction terminals, thereby providing a localized point of network access for one or more electronic transaction terminal(s) in a gaming environment within which the electromagnetic spectrum may be highly congested and radio frequency interference is prevalent. The electronic transaction terminal may comprise a printer and/or a printer port for connection of an external printer or a plurality of printers connected to a plurality of gaming devices via wired, wireless, or other communication means. The electronic transaction terminal may be powered by alternating current, direct current, battery, stored charge, solar, or any other known power source available at the point of use. Electronic transaction terminals powered by stored energy sources may be periodically recharged from other power sources, including but not limited to charging a stored energy source when the electronic transaction terminal is placed in a special cradle that may provide wired network connectivity as described above in addition to power charging capability.

The electronic transaction terminal may comprise secure mobile applications and one or more electronic transaction applications. The electronic transaction terminal comprises a communication device upon electronic transaction instructions to the patron's financial institution include, but are not limited to, use of communication protocols over a secured wireless data network or secured wired data network, near field communication protocols and methods, or optical communication protocols and methods. One of the electronic transaction applications may be a user interface application and the user interface application may include one or more fields including, but not limited to, identification of a) the credit system that will issue or authorize the issuance of gaming or amusement credits, b) information regarding the patron's financial institution and his account therewith, c) the appropriate secured banking network by which to communicate with the patron's financial institution, d) the type of transaction, e) the amount of the electronic transaction, f) the date and time, g) the name of host system, h) the name of the patron, and i) any other information required to successfully complete the transaction. The system may further include a plurality of electronic transaction terminals associated with one or more gaming device(s) or system(s), player station(s), or other locations within the gaming environment or amusement environment.

The secured second computing device comprises a database with encrypted data, a communication interface to the secured first computing device, an operator management application, and at least one electronic firewall between the secured second computing device and the secured first computing device. The database includes encrypted data for each electronic transaction and the encrypted data comprise at least one of the electronic transaction terminal ID, transaction ID, gaming device ID, credit system ID, patron's name, host system's name, transaction value, date, and time.

The secured first computing device connects to the secured banking network via a single, secure, access controlled connection. The connection is access controlled by an application privilege protocol and secured by an application security protocol and the application privilege protocol is managed by the secured first computing device and comprises a first table associating Global Unique Identifiers (GUIDs) of electronic transaction applications, secured banking networks, and patron financial accounts available to the electronic transaction terminal. The application security protocol comprises one of secure Hypertext Transfer Protocol HTTP Secure-Hypertext Transfer Protocol (S-HTTP), link encryption or web services security (WS-S). The secure client-side application comprises an application user interface. The electronic transaction terminal requests functionality from the secured first computing device via one of Extensible Mark-up Language (XML) messages embedded in Simple Object Access Protocol (SOAP) requests, Action Script Message Format (AMF), or Secure Mobile Application Platform (SMAP).

The Secured banking network may be one of PLUS, STAR, STAR Preferred, CIRRUS, INTERLINK, MONEY PASS, NYCE, Jeanie, Jeanie Preferred, Interlink, Interlink Business, PAVD, PAVD Business, Alaska Option, Armed Forces Financial Network, NetWorks, Pulse, Pulse Preferred, Pulse Limited, Shazam, Maestro, Credit Union 24, ACCEL, ACCEL Preferred, NYCE Preferred, or ATH Network or any similar financial network which may provide access to a financial institution or service at which the patron has an account suitable for use in electronic transactions.

In one embodiment, a cooperative system such as a casino management system ("CMS"), host system, or other inter- or intra-facility system may be deployed by operator of the facility and communicatively connected to the electronic transaction system. Said cooperative system may be an existing CMS present within the gaming environment, another networked system used for purposes related or unrelated to the operation, accounting, or management of gaming devices or other equipment within the gaming environment, a communication system reserved solely to the operation of the electronic transaction system, or any other means of electronic data exchange. The network may employ any known means of electronic communication, including but not limited to wired, wireless, near-field communications (NFC), other electromagnetic, fiber optic, other optical, or other communication means and/or protocols, including but not limited to Bluetooth, infrared, optical, radio frequency, GPRS, and satellite. The host network may also employ any or all known means of electronic security measures to insure the complete integrity and security of all data transmitted thereon.

In one embodiment, the electronic transaction system operates wholly independent of any other cooperative system such as a casino management system, host system, or other inter- or intra-facility system.

This invention provides numerous improvements and advantages over the present art. It provides an immediate service that permits patrons to efficiently retrieve funds for gaming and amusement activities at their convenience. The electronic transaction system incorporates secure ticketing and banking networks to protect the integrity and privacy of patrons. Further, the system is designed to maintain full security of the patron's financial and personal identification data by not unnecessarily routing said data through the casino operator's system. The outbound banking and electronic transaction-specific data is securely routed directly to the appropriate financial network via the secured first computing device so that any possible breach of security involving a cooperative system could not possibly compromise said data. Patrons are assured that their transaction data is handled in exactly the same manner as at any other secure transaction terminal or automatic teller machine. Further, by not requiring the patron to suspend gaming activity to access a cash machine at another location, he is much more likely to continue his gaming activity to the benefit of both the patron's enjoyment and the casino operator's revenue. In addition, the invention provides a method of electronically transferring funds to the patron's other accounts or debit instruments at the conclusion of his gaming activity for subsequent uses in gaming or non-gaming activities. Yet another advantage of the present invention that it provide the capability to provide a transaction receipt to the patron, identical to that provided in any other POS or ATM transaction, so that the patron may have a durable record as evidence of the electronic transaction. This has the added advantage of meeting regulatory requirements for approval in gaming environments. In another embodiment, an electronic transaction receipt may be provided to the patron via e-mail to an e-mail address associated with the patron, via SMS message, via fax transmission, or via any other electronic method in addition to or in lieu of a printed receipt generated at the point of the transaction. The system's intrinsic ability to provide one or more form(s) of a transaction receipt solves a known problem in the present art and represents a considerable improvement thereupon, but that functionality is incidental, and not essential, to the operation of the system. In one embodiment where providing a transaction receipt to a patron is expressly not desired and not required, the system may be easily configured in a manner so as not to generate or provide any such receipt. Such configuration does not affect any other operation or functionality of the system.

A principal advantage of this invention over the present art is the enhanced security it provides. The use of a secured first computing device provides the most secure and efficient handling of sensitive financial transactions possible. The electronic transaction terminals used by patrons to initiate electronic transactions connects exclusively to the secured first computing device using the highest grade of encryption and most secure communication methods and protocols available. Only authorized electronic transaction terminals may connect to the secured first computing device to initiate such financial transactions. The secured first computing device also employs the highest grade of encryption and most secure security protocols available to communicate with patrons' financial institutions via high security industry-standard secured banking networks. When transaction results are received by the secured first computing device via the secured banking network, such data is routed to a separate and equally secure secured second computing device for recordation and reconciliation purposes. The monetary-equivalent indicia of game play credit is not returned to the electronic transaction terminal at which the transaction originated, but a printed receipt is provided to the patron by that terminal or gaming device at the patron's location as evidence of the results of the electronic transaction. The secured second computing device also provides full accounting for all electronic transaction activity within the entire system. This topology provides a highly reliable and secure system by which patrons in gaming environments and amusement environments may conveniently and efficiently retrieve funds from financial accounts for their participation in game play activities and other purposes.

Yet another principal advantage of this invention over the present art is the system's ability to function in conjunction with, or independently from, any mechanical, electrical, or electromechanical device defined as a "gaming device" by regulatory authorities or used in support thereof. One considerable advantage of the system is its ability to utilize components and systems of gaming devices already present in a gaming environment, including but not limited to ticket readers and printers, card readers and printers, networking systems, and the like. However, the invention may operate wholly independent of any such gaming devices and/or systems if so desired. This is particularly relevant to the play of table games conducted by live dealers or other authorized gaming or amusement personnel within which no gaming device(s) as defined by regulatory authorities are utilized. In one embodiment, the system provides patrons with the availability of electronic transaction terminals at one or more points of wagering activity other than those associated with defined gaming devices.

BRIEF DESCRIPTION OF THE DRAWINGS

Without limiting the invention to the features and embodiments depicted, certain aspects this disclosure, including the preferred embodiment, are described in association with the appended figures.

DETAILED DESCRIPTION OF THE INVENTION

Figure 1:
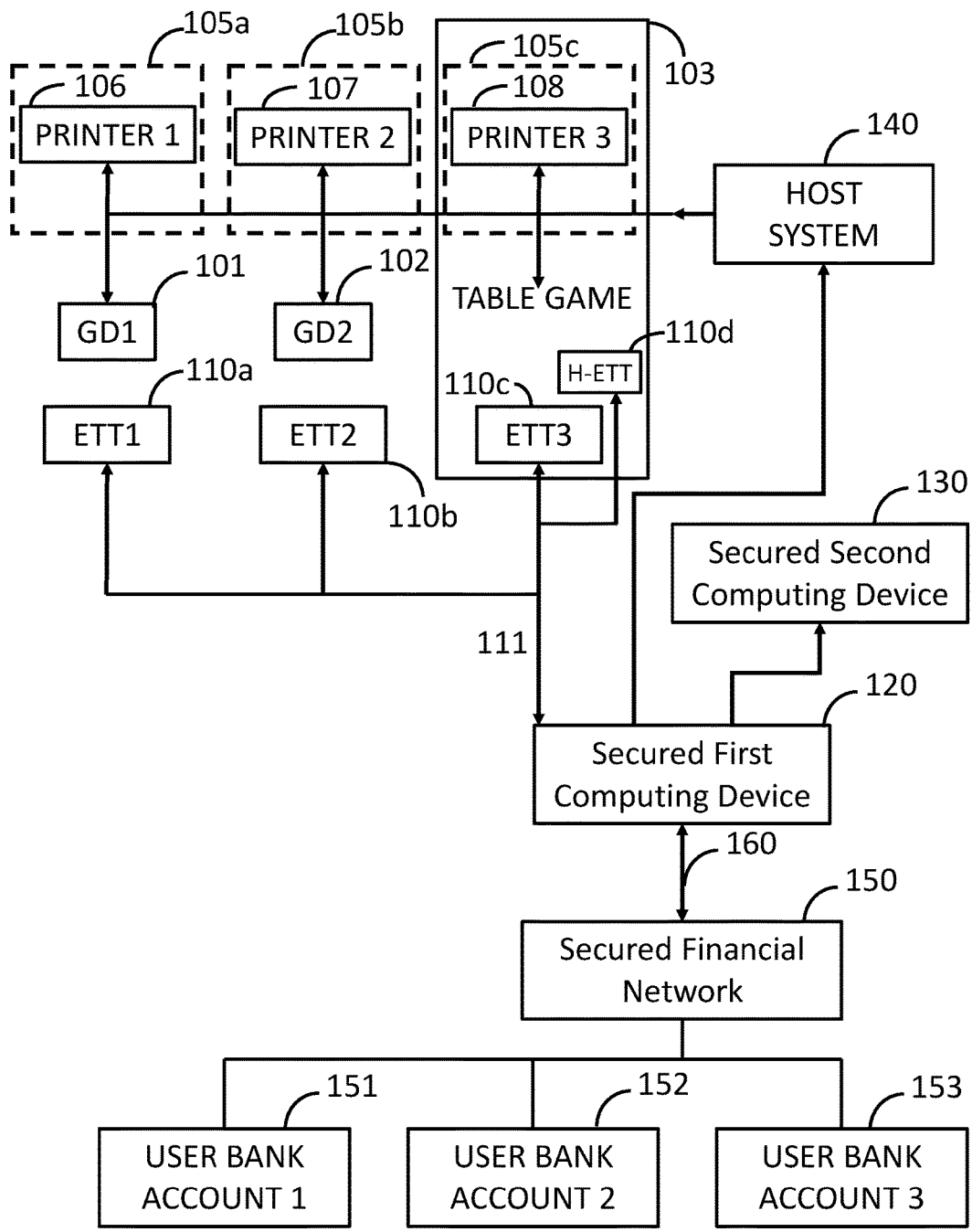
FIG. 1 is an overview diagram of the electronic transaction system.

The present invention relates to systems and methods for electronic transaction systems in gaming environments and amusement environments, and in particular to electronic transactions for use in the purchase of credits for table-based casino gaming activities.

The electronic transaction system includes a secure electronic transaction terminal with PIN (Personal Identification Number) pad that may be a Payment Card Industry ("PCI") PIN Entry Device ("PED") certified device along with a magnetic stripe and smart card reader and a display. The electronic transaction terminal may also be or a chip-and-PIN (EMV) certified device suitable for use with chip-and-PIN (EMV) cards. The electronic transaction terminal allows the patron to obtain monetary equivalents without having to leave and find a ATM machine. The electronic transaction terminal device may be an external attachment to the gaming or amusement device or embedded in the gaming or amusement device. Each electronic transaction terminal is associated with a specific gaming or amusement device or a gaming patron's location. The process of purchasing credits is similar to that of any other point-of-sale ("POS") process.

When the patron swipes his payment card, enters a PIN and requests a specific amount to be debited from his account, the electronic transaction terminal initiates a secured request via the secured first computing device through the electronic transaction system to a financial network for approval or denial. The amount of the transaction may include the amount of gaming or amusement credits to be purchased plus any fees associated with the transaction. If the transaction request is approved, the electronic transaction system provides authorized monetary value credits to be dispensed to the patron via a credit system. The system directs the credit system to dispense a suitable form of credit, in physical or electronic form, to or on behalf of the player. In one embodiment, the system may initiate and cause a ticket to be printed in the authorized amount at the specific location and utilizing hardware in the gaming environment associated with the electronic transaction terminal that originated the transaction. Alternatively, system may direct a cooperative system to update the patron's loyalty/prepaid debit card account with the authorized funds. The patron can then use the card or ticket on a variety of gaming or amusement devices to receive game credits or redeem the card or ticket for cash through the authorized gaming or amusement device system.

In one embodiment particularly suitable for live table games, the ticket printed by the electronic transaction system in response to a successful electronic transaction is an immediate system redeemed voucher that is provided directly to the dealer or other authorized gaming or amusement personnel instead of to the patron as would occur at an EGM. The patron would still receive a durable printed receipt for the transaction from the electronic transaction terminal as evidence of the successful transaction, but the physical indicia of credit provided by the credit system in the form of the printed system redeemed voucher is retrieved from the credit system by the dealer or other authorized gaming or amusement personnel who then provides the patron with the equivalent monetary value in some preferred physical indicia, such as but not limited to gaming chips. The system redeemed voucher is then retained in the table's cash box for accounting and reconciliation of the gaming chip purchase transactions at that table. The system redeemed voucher has value only as (1) instructions to the dealer or other authorized gaming or amusement personnel to disburse gaming chips or other suitable form to the patron, and (2) as tangible evidence that such disbursement was made at the gaming table for accounting and reconciliation purposes. The dealer or other authorized gaming or amusement personnel who receive the system redeemed voucher from the credit system do not perform any further action to redeem the system redeemed voucher. Unlike tickets dispensed by the credit system directly to a patron that may be redeemed in a variety of ways as described elsewhere herein, the system redeemed voucher has no inherent monetary value itself and is therefore not convertible into cash, credits, or other monetary value in the same manner as any other gaming ticket would be. As an instrument that is evidence of a transaction that has already been redeemed by the system, it is not a negotiable instrument and therefore does not represent a future payment liability to the operator of the casino.

A cooperative card and/or ticket validation system may be connected to or in communication with a card and/or ticket validation network. The card and/or ticket validation system includes a card and/or ticket validation server and operator interfaces, to enable the operators to redeem card credits and/or tickets as well as to monitor card and/or ticketing transactions. The card and/or ticket validation network enables a plurality of gaming or amusement device processors in the same casino or property establishment to communicate with the same card and/or ticket validation system.

In one embodiment, a ticket reader uses software for reading the barcode of a ticket provided by the electronic transaction system, and after reading the barcode, the ticket reader passes the barcode information to the processor of an associated gaming or amusement device. The gaming or amusement device then forwards the barcode information to the ticket validation system via the ticket validation network to verify its authenticity. After verifying the authenticity, the ticket validation system presents an authorization to the gaming or amusement device for the ticket amount, via the ticket validation network, and the gaming device in turn adds credits to its credit meter in the amount authorized by the ticket validation system. Finally, the gaming or amusement device instructs the ticket reader to retain the used ticket internally so that it is not returned to the presenter.

The processor of the gaming or amusement device may still be connected to or in communication with the ticket reader/validator and is responsible for verifying validity of the ticket. The electronic transaction system communicates a request to the cooperative card and/or ticket system which after authorization of the transaction, provides credits associated to the card or prints a ticket with a barcode from the gaming or amusement device.

The ticket validation network is thus preferably a local area network. This local area network, in turn, is connected to or is in communication with a secured first computing device that validates electronic transaction requests. The gaming devices may also be equipped with electronic transaction terminals that control a card reader, a secure PCI certified PIN Pad and a display for enabling a patron to enter the patron's account number, transaction type (i.e., credit or debit), desired transaction amount and personal identification number (PIN). The display prompts the patron for such information and informs the patron of transaction request approvals and rejections. A printer may be attached to print out a receipt for evidence of the transaction.

One embodiment of the present invention enables the patron to enter the required transaction information which may include the PIN number, transaction type, and the transaction amount. The request is processed and, if approved, the patron receives a monetary-equivalent ticket in the amount of the requested transaction or the gaming device is credited with the approved amount. This effectively replicates every step in a conventional POS transaction except that the physical indicia is a monetary-equivalent ticket or credits applied to a specific gaming device instead of cash or other tangible item. The monetary-equivalent ticket is redeemable for cash through a ticket redemption machine, cashier station or kiosk, or for placing credits into a gaming or amusement device that has a card and/or ticket reader. The present invention therefore provides time for the patron to confirm the patron's decision to withdraw the money. The patron can choose to not spend the money, to wager the money or to spend it in a non-gaming fashion.

The patron can also remove money from their payment card account on one machine with the idea of playing the money or credit/ticket at another machine. This enables machines that accept player's hospitality or loyalty cards or tickets, but not payment cards, to be utilized with funds from a payment card transaction. Further, by communicating through a cooperative gaming or amusement device host system to the printer that already exists in a gaming or amusement device, the cost of a separate ticket printer may be eliminated. Having one printer instead of two reduces the number of printer rolls that the gaming establishments have to stock and reload.

In operation, the patron initiates a request to electronically access funds in his financial account by inserting a payment card into a specific electronic transaction terminal associated with a specific gaming device or patron location at a gaming table, selects the payment transaction type and account by which it is withdrawing funds, accepts any service charge fees associated with the transaction, and then enters a PIN number and an amount. The transaction request goes out through the network which the electronic transaction terminal is connected to (wireless or wired), to the secured first computing device of the electronic transaction system, which transmits the request through the secured banking network to process the transaction request, which returns an appropriate response over the financial network back to the secured first computing device, which routes a specific response back through the appropriate network to the specific electronic transaction terminal assigned to a specific amusement or gaming device or location.

If the patron's transaction request is approved, the specific electronic transaction terminal will get a message such as "Transaction Approved, Please wait for TITO Ticket to be Printed" or the gaming device is automatically credited with the approved amount requested. The electronic transaction terminal or gaming device may also print a separate receipt for the patron as evidence of the successful ATM transaction using a printer incorporated in the electronic transaction terminal and/or at the gaming device. Simultaneously, the secured first computing device communicates to a secured second computing device to specify which specific gaming or amusement device or patron location has initiated and successfully completed the electronic transaction. The secured first computing device then communicates with specific credit device, including but not limited to a gaming, amusement device, or other printer directly or via a cooperative EGM, table, or amusement host system to print a ticket representing the monetary value of the electronic transaction. Said ticket may be used with any gaming device that will accept such a ticket. The patron can alternatively redeem the ticket for cash, or request a ticket for the credits. In one embodiment, the electronic transaction system may provide a system redeemed voucher to a dealer or other authorized gaming or amusement personnel directing them to provide casino chips or other physical indicia of credit to the patron.

If the patron's transaction request is denied for whatever reason, the secured first computing device of the electronic transaction system will simply send a denial message back to the electronic transaction terminal and request either a different PIN or payment card, or for the patron to cancel and exit the transaction.

In lieu of printing a monetary-equivalent ticket, game play credit in the amount of the successful electronic transaction may be applied directly to the EGM or other gaming device, thereby eliminating the step of printing and reinserting the ticket into the machine to redeem game play credits. The patron can simply continue playing with the new credit received, or he can hit the "Cash out" button for the printer to print the ticket, or transfer the funds directly back to the patron's originating financial account or other account at his direction.

As an alternative to printing tickets, the monetary-equivalent value of the electronic transaction may be transferred by the electronic transaction system from the patron's financial account into his player's hospitality or loyalty card account. The payment card associated with such financial account may be used with the electronic transaction system to purchase credits for use with a gaming or amusement device and later to cash out any remaining credits back to the player's hospitality or loyalty card account. The player's hospitality or loyalty card accounts may be both promotional in nature and capable of a stored value feature, thereby enabling the patron to use monetary-equivalent game play credits elsewhere in the casino operator's facility for dining, entertainment, shopping, and the like. These player's hospitality or loyalty card accounts are normally limited to use in the casino operator's co-owned or co-managed facilities and are not accepted elsewhere.

In order to permit wider use of unused game play credit by patrons, in one embodiment said credits may be transferred to a debit card account linked to and accessible by either the Visa or Master Card networks. Such cards could be issued by the casino operator or, alternatively, issued by a third party card issuer and servicing company on behalf of and in the name of the casino operator. With this embodiment, the patron would be enabled to spend the unused game play credits at any establishment that accepts such debit cards. In one embodiment, the invention allows functions normally associated with player's hospitality or loyalty card accounts to be coupled to such prepaid debit card. By allowing a transfer of funds from one's financial account to a debit card with the customer tracking and research functionality of player's hospitality or loyalty card, the casino operator would be able to provide additional offers and incentives based on patrons' use of their debit cards, such as the awarding of loyalty points for certain purchases, while deriving additional information about the spending habits and product preferences of its patrons.

Referring to FIG. 1, an electronic transaction system 100 includes gaming devices 101, 102, credit systems 105a, 105b, 105c, a cooperative gaming host system 140, electronic transaction terminals 110a-110d, a secured first computing device 120 and a secured second computing device 130. Cooperative host system 140, which in some embodiments may be a property-wide casino management system and in other embodiments may be a direct wired or wireless connection, a simple data communication link, or a local network, is connected to the credit systems 105a, 105b, and 105c. Each credit system 105a, 105b, 105c may also be connected to a printer 106, 107, 108, respectively, for printing tickets. Electronic transaction terminals 110 are placed in the same locations as the gaming devices 101, 102, 103. Electronic transaction terminals 110a-110d communicate with the secured banking networks 150 via network connections of the secured first computing device. All communications between the electronic transaction terminals 110a-110d and the secured banking networks 150 pass through the secured first computing device 120. The secured banking networks 150 provide connections to the patron's financial accounts 151, 152, 153 from which the funds are withdrawn. In one embodiment, the financial account is a bank account. In other embodiments, the financial accounts are online bank accounts, investment accounts, business accounts, credit lines, credit card accounts, debit card accounts, or accounts with non-financial institution third party services including but not limited to PayPal accounts, among others. Examples of secured banking networks include PLUS, STAR, CIRRUS, INTERLINK, MONEY PASS, among others. An electronic transaction approval is communicated back to the secured first computing device 120 via the secured banking networks 150 and the secured first computing device 120 may transmit transaction data to the secured second computing device 130. The secured first computing device 120 then transmits authorization to dispense indicia of credit to the appropriate credit system 105a-105c designated by the patron.

Figure 2:
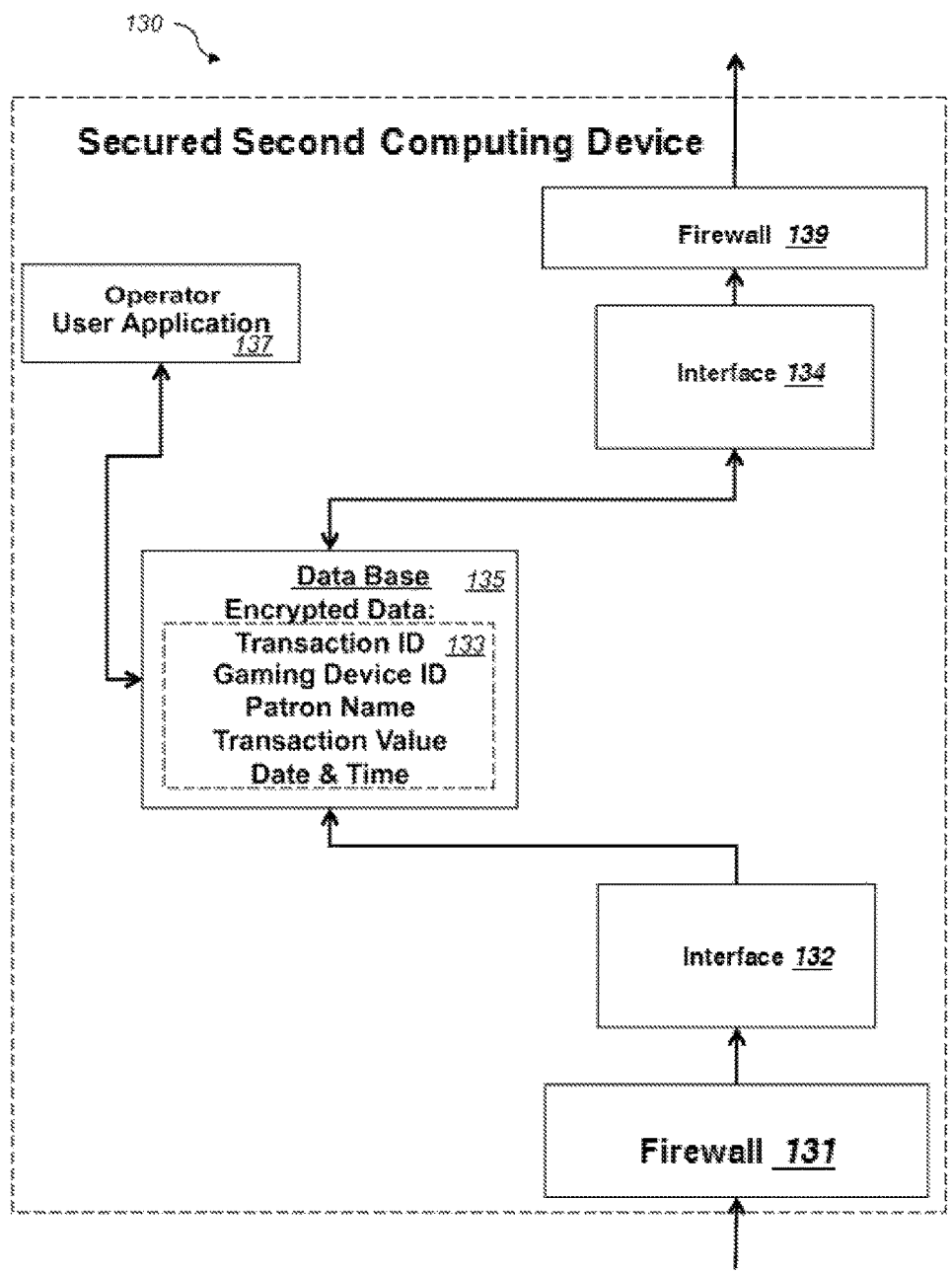
FIG. 2 is a block diagram of the secured second computing device of FIG. 1.

Referring to FIG. 2, the ACS secured second computing device 130 includes a database 135, firewalls 131, 139, interfaces 132, 134 and an operator user application 137. Firewall 131 is located between the secured second computing device 130 and the secured first computing device 120. Firewall 139 is located between the secured second computing device 130 and the gaming host system 140. Interface 132 is for communications between the secured second computing device 130 and the secured first computing device 120. Interface 134 is for communications between the secured second computing device 130 and the gaming host system 140. Database 135 includes encrypted data for each transaction 133. The transaction data include a transaction ID, a credit system ID, a gaming device ID, patron's name, transaction value, date and time.

Figure 3:
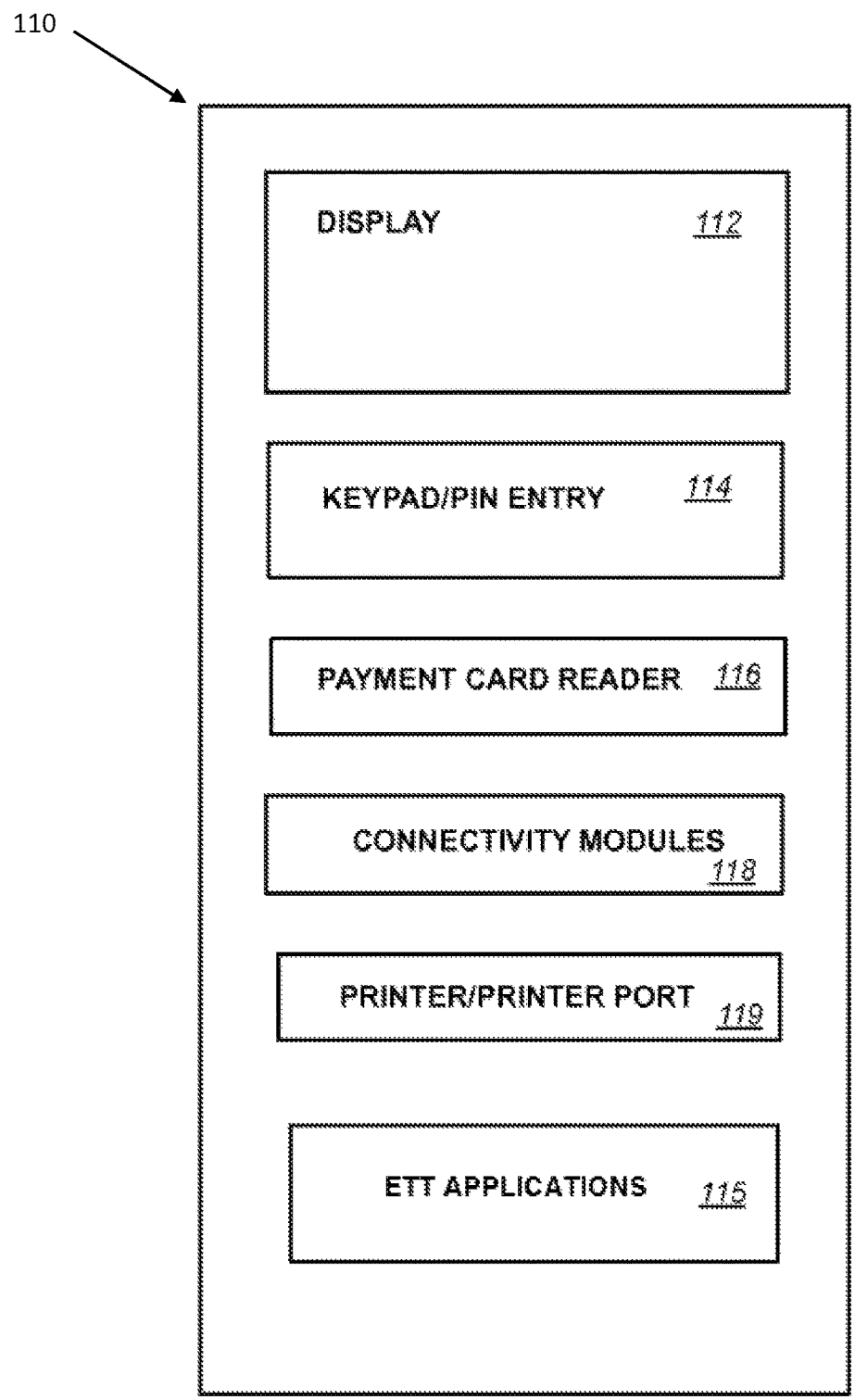
FIG. 3 is a block diagram of the electronic transaction terminal of FIG. 1.

Referring to FIG. 3, an electronic transaction terminal 110 includes a display 112, a keypad/PIN entry 114, a payment card reader 116, connectivity modules 118, a printer and/or printer ports 119, and electronic transaction applications 115. The payment card reader may be a smart card reader, magnetic card reader, chip-and-PIN (EMV) card reader, contactless card reader, proximity mobile payments reader that enables communication with smart phone devices, or contactless proximity card reader that processes secure smart ticketing and electronic payments using contactless secure mobile commerce technology. Electronic transaction applications 115 include applications that identify the credit system and gaming device associated with the electronic transaction terminal, secured banking network, type of transaction, amount of the transaction, date, time and name of patron.

Referring to FIG. 1, one or more electronic transaction terminals 110 may interact with the secured first computing device 120 via network connections 111. The secured first computing device 120 is in contact with the patron's bank accounts 151, 152, 153, via the secured banking networks 150. The secured banking networks 150 are connected to the secured first computing device 120 via a single, secure, access controlled connection 160.

The electronic transaction terminals 110d may be handheld remote communication devices (H-ETT) on which the application user interface is executed. Examples of handheld communication devices include payment terminals such as those manufactured and sold in North America by Ingenico, Inc., of Alpharetta, Ga., mobile phones, personal digital assistant (PDA), payment modules, and portable computers, among others. In other embodiments, electronic transaction terminals 110 are not-handheld device and may be devices such as personal computers, servers, or any other computing circuits. Electronic transaction terminals suitable for use in gaming environments may also be table top devices 110c, external attachments to EGMs or other hardware, or embedded in an EGM, gaming device, or amusement device. Electronic transaction terminals 110 either may comprise a device classified as a "gaming device" or may not be classified, in whole or in part, as a gaming device as defined by any regulatory authority. Electronic transaction terminals may also include remote/mobile/handheld system components or terminals assigned to a table games 103 or a parlor game. Table game-specific tethered processing terminals 110d may include embedded swipe components fitted to seated game stations and card, dice, and roulette tables 103, patron locations at race and sports books, keno and bingo operations, and the like, or may be swipe components embedded into mobile handheld games.

Secured first computing device 120 is a single, secure pipeline through which the secured banking networks 150 and the electronic transaction terminals 110 communicate. Secured first computing device 120 either may comprise a device classified as a "gaming device" or may not be classified, in whole or in part, as a gaming device as defined by any regulatory authority. Electronic transaction terminals 110 are able to contact only secured first computing device 120 and secured first computing device 120 controls the transfer of sensitive and proprietary data between the secured banking networks 150 and electronic transaction terminals 110 during electronic transactions. This method requires and establishes authentication of the electronic transaction terminals 110 by the secured first computing device 120 and provides the necessary encryption and secure transmission of network traffic to and from electronic transaction terminals 110.

Figure 4:
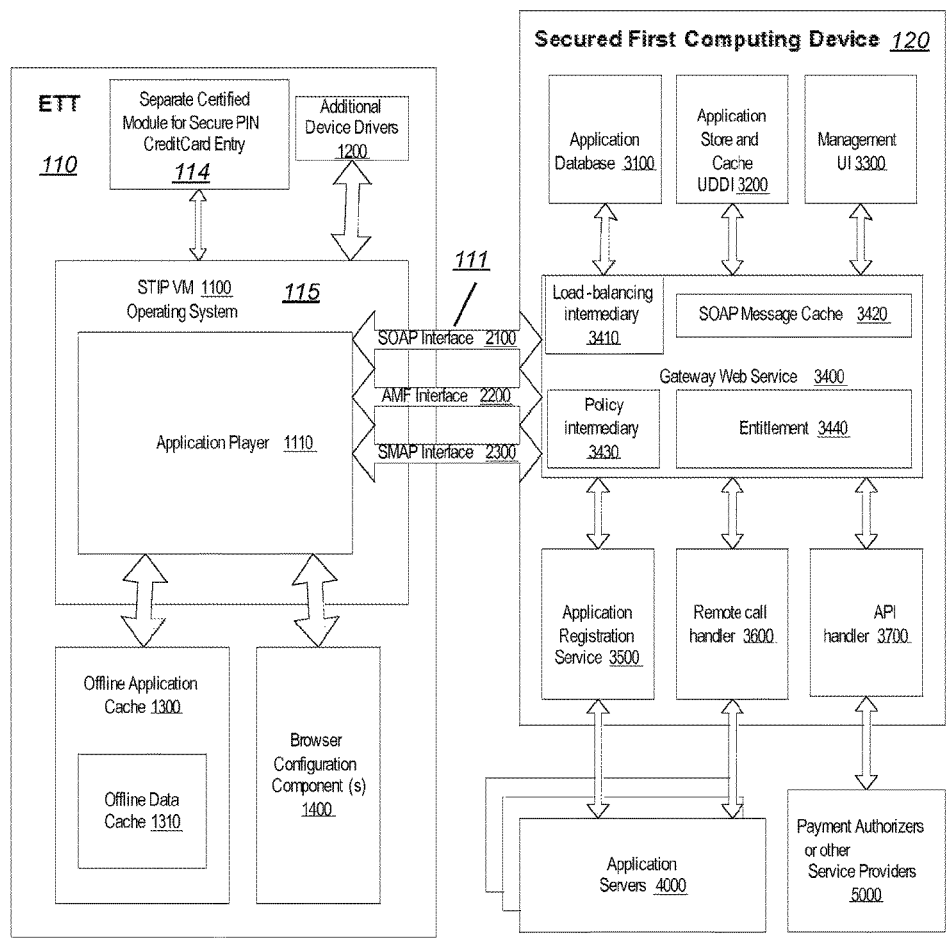
FIG. 4 is a block diagram of the electronic transaction terminal and the secured first computing device.

Referring to FIG. 3 and FIG. 4, electronic transaction terminal 110 includes an operating system or managed code environment 1100 in which application player 1110 is executed. The managed code environment 1100 is in contact with device drivers 1200. Device drivers 1200 are any hardware access layer modules that allow the player 1110 to access peripheral devices such as card readers 116 or printers 119. Application player 1110 is in contact with browser configuration components 1400 and an offline application cache 1300 with its associated offline application data 1310. The application player 1110 requests functionality from the secured first computing device 120 through XML messages embedded in Simple Object Access Protocol (SOAP) requests and then interprets the XML messages it receives embedded in SOAP responses from the secured first computing device 120. The application player 1110 has access to a local list of secured banking networks it is authorized to request and relevant security keys and settings. The secured first computing device 120 includes a server-side intermediary 3400 that receives the XML messages embedded in SOAP requests from the player 1110 and sends to the player 1110 XML messages embedded in SOAP responses. As mentioned above, the format of communications between the application player 1110 and the server-side intermediary 3400 is XML and the communication connection is via a SOAP interface 2100.

In one example, the managed code environment 1110 is a Small Technical Interoperability Platform Virtual Machine (STIP VM). Other examples of the managed code environment 1100 include Java 2 Platform Micro Edition (J2ME), .NET and Flash Lite, among others. Operating environment 1100 provides a way for the player 1110 to access operating system resources. The managed code environment 1100 executes the application player 1110, which is in contact with browser configuration components 1400 and an offline application cache 1300 with its associated offline application data 1310. Offline application cache 1300 is a set of applications (XML files) that this player instance has downloaded. Offline data cache 1310 is the set of stored web service calls that each application has saved for later execution on the application server host. These stored web service calls enable the offline functionality. Browser Configuration Components 1400 is a set of device-specific parameters that the player 1110 and its applications use to tailor the patrons experience of applications. These configuration components are locally stored name-value pairs that can be managed both locally and remotely via the server 3400. Examples of browser configuration parameters include, maximum size of the offline cache, auto-player-update on/off, auto-application-update on/off, and debug logging on/off, among others.

Referring again to FIG. 4, secured first computing device 120 includes a server-side intermediary or gateway web service 3400 through which all communications to and from the electronic transaction terminals 110 pass. The server-side intermediary 3400 has access to a database with a table that associates Global Unique Identifiers (GUIDs) with the remote secured banking networks. The gateway web service 3400 comprises one or more server-side machine(s) that act as intermediaries between the electronic transaction terminals 110 and the application servers 4000 which host the secured banking networks that provide bank account access to the electronic transaction terminals 110. These one or more server-side machines include a load-balancing intermediary 3410, a SOAP message cache 3420, a policy intermediary 3430 and an entitlement module 3440. The load-balancing intermediary 3410 is designed to facilitate the demands of numerous electronic transaction terminals 110 simultaneously by dispatching requests evenly among the various server-side machines that comprise the secured first computing device 120. The SOAP Message Cache 3420 is a queue of SOAP messages to be executed by the server whose results will typically be passed back to an electronic transaction terminal 110. The policy intermediary 3430 ensures that only authorized patrons on authorized electronic transaction terminal can access the requested secured banking networks and bank accounts. The entitlement module 3440 controls the access that a request has to the resources it desires. Fine grained web service access control is enabled by this entitlement module.

The gateway web service 3400 is in communication with an application database 3100, an application store and cache 3200, a management UI 3300, an application registration service 3500, a remote call handler 3600 and an API handler 3700. The application database 3100 includes a set of application XML files representing the currently available applications in the system. The application database 3100 cross-references Globally Unique Identifiers (GUIDS) sent by the client application player 1110 with the XML user interface of the requested secured banking network and bank account. The application store and cache 3200 is an interface into the application database 3100 that conforms to the Universal Description Discovery and Integration (UDDI) discovery standards for machine readable service functionality discovery. Management User Interface (UI) 3300 is a set of web application screens that allow data center administrators to control the use of the system, for example, allowing or disallowing access to a particular secured banking network, or promoting an application from test to production. The Application Registration Service 3500 is the module that allows the developer to publish an application from the Integrated Development Environment (IDE). The remote call handler 3600 executes properly authenticated web service calls and the Application Program Interface (API) handler 3700 is an interface that external services 5000 (like payment processors) implement in order to be accessed from within the system.

Secured first computing device 120 securely handles interaction between the electronic transaction terminals 110 and the application servers 4000 which host the secured banking network web services that provide access to the patron's financial accounts, and between the electronic transaction terminals 110 and any supporting applications 5000. All data processing and other calculations and manipulations are executed by secured banking network web services hosted on application servers 4000. The patron's experience on the electronic transaction terminal 110 comprises only display of an XML user interface and subsequent display of application results, also received in the form of XML.

Secured first computing device 120 provides a single, secure, access-controlled and actively managed channel from the application running on the electronic transaction terminal 110 to the (one or more) secured banking network web services. Since the player 1110 communicates only with the secured first computing device 120, applications running on the electronic transaction terminal 110 cannot connect with unauthorized web applications and are therefore secure. The system is secure along all links via the use of industry standard link encryption and access controlled at all interfaces via the use of industry-standard user authentication. Link encryption refers to communications security protocols that encrypt and decrypt all traffic at each end of a communications line. Examples of industry standard link encryptions include secure HTTP (S-HTTP), web-services security (WS-S) and Way Systems Secure mobile application platform (WS-SMAP), among others. User authentication refers to the process of establishing or confirming the digital identity of a user or device such as the electronic transaction terminal 110 or the servers 4000 and 5000. Examples of industry standard user authentication include WS-S, lightweight directory access protocol (LDAP) and proprietary device authentication, among others.

Secured first computing device 120 provides fine-grained access control over web service (WS) access organized by remote-user and remote-device that spans multiple WS hosts and organizations and requires no instrumentation of the individual web services. As was mentioned above, the secured first computing device 120 maintains access-control lists that relate patrons and electronic transaction terminals 110 to individual secured banking network web services and provide for granting and denying access by those patrons to those services. These lists contain the unique combination of GUIDS and the identity of remote secured banking network web services available to the electronic transaction terminals 110.

A key feature of application security best-practice is the concept of non-repudiation. Non-repudiation is defined as the ability of a component to prove that a particular action of that component was driven by an interaction with another component rather than by some invisible, internal process of that component. The key enabler of non-repudiation is auditing, the storage of a trail of actions and data that can easily be used to reconstruct the interactions of the components of the system. The secured first computing device 120 provides a complete audit trail of the interaction of secured banking network web services with the remote electronic transaction terminals 110, thus ensuring non-repudiation. This audit trail identifies the electronic transaction terminal 110, the patron, and the details of the underlying remote connection to the device. In one embodiment, fine-grained access control and auditing enable the secured first computing device 120 to bill patrons at an equally fine-grained level. This enables tiered service by enterprises implementing the system where patrons can be billed for individual calls within a session rather than at the more coarse system of billing for time spent within the application.

Figure 5:
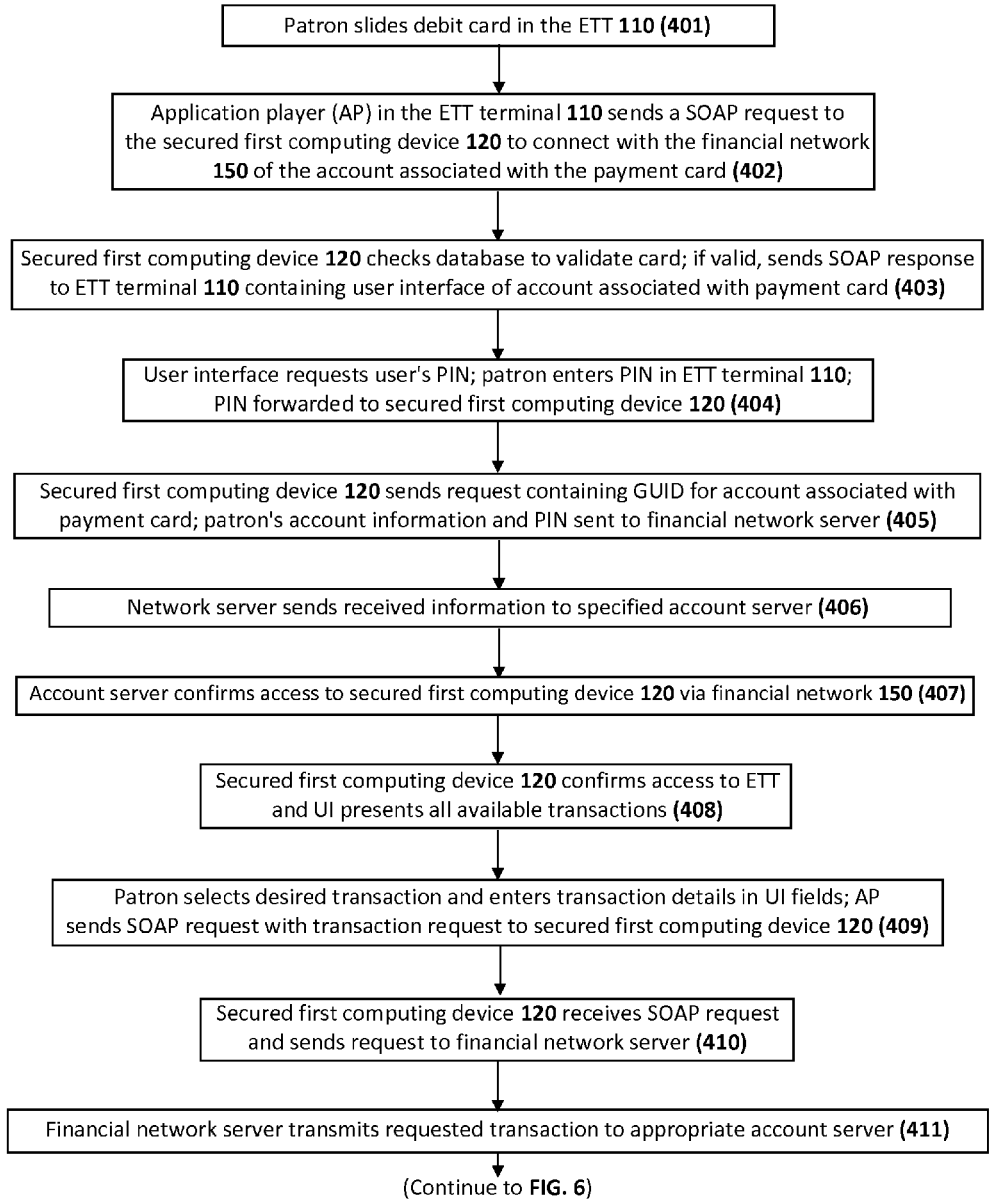
FIG. 5 and FIG. 6 depict the flow diagram of the electronic transaction process.
Figure 6:
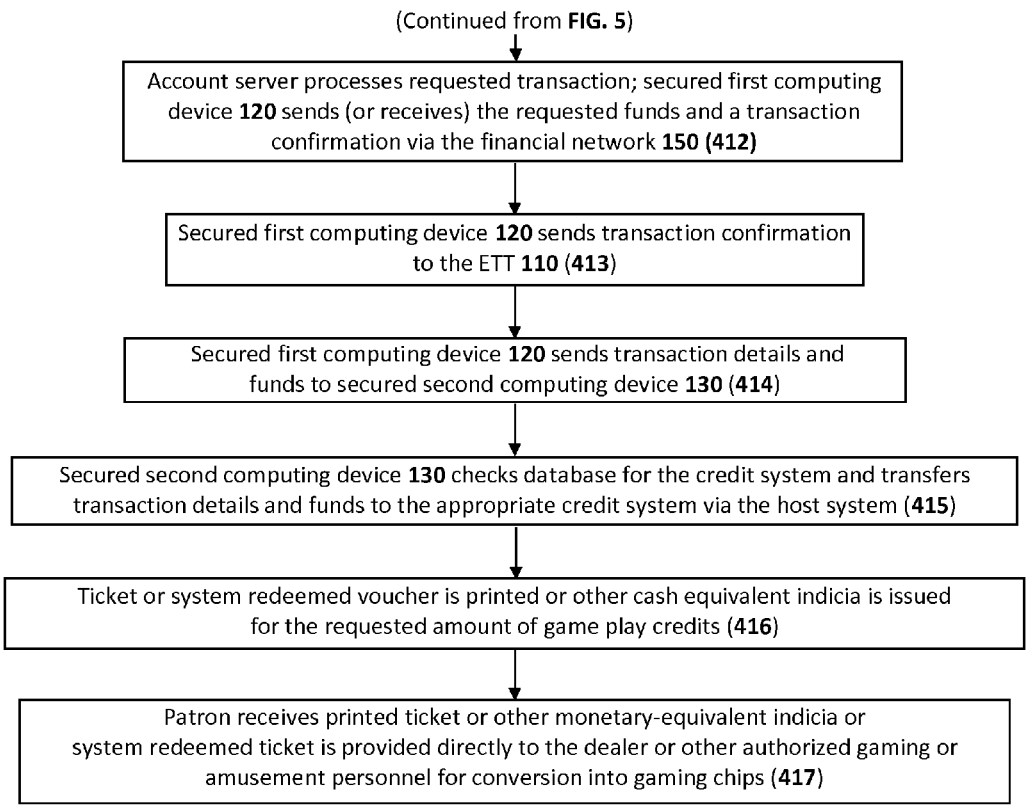

In operation, a patron starts the application player 1110 on the electronic transaction terminal 110. The application player 1110 consults first the offline application cache 1300 and presents a list of those applications which this electronic transaction terminal 110 and patron are authorized to execute. Referring to FIG. 5 and FIG. 6, if the electronic transaction terminal 110 and the secured first computing device 120 are both actively connected to the network, the process includes the following steps. First, a patron slides a payment card in the electronic transaction terminal (401). This action starts an application player (AP) in the electronic transaction terminal and the AP sends a SOAP request to the secured first computing device 120 to connect with the secured banking network of the account associated with the payment card (402). The secured first computing device 120 checks a database and if this is an acceptable payment card, it sends a SOAP response to the electronic transaction terminal 110 containing the user interface (UI) of the account associated with the payment card (403). The UI requests the patron's PIN, the patron enters PIN and the information is sent to the secured first computing device 120 (404). Next, the secured first computing device 120 sends to the secured banking network server a request containing a GUID for the account associated with the payment card, the patron's account information, and the patron's PIN (405). The secured banking network server forwards the received information to the specified server (406) and the server confirms access to the secured first computing device 120 via the secured banking network (407). The secured first computing device 120 confirms access and the UI presents all available transactions (408). Examples of the available transactions include but are not limited to credit purchase, withdrawal, deposit and balance inquiry, among others. The patron selects a desired transaction and enters the transaction details in the corresponding UI fields. The AP then sends a SOAP request to secured first computing device 120 with the requested transaction (409). Typical transaction details include, amount, currency, gaming device, among others. The secured first computing device 120 receives the SOAP request, determines appropriate secured banking network server for the requested transaction and sends the request to the secured banking network server (410). The secured banking network server transmits the request to the appropriate server (411) and the server processes the requested transaction, sends (or receives) the requested funds and a transaction confirmation to the secured first computing device 120 via the secured banking network (412). Next, the secured first computing device 120 sends the transaction confirmation to the electronic transaction terminal 110 (413) and the transaction details to the secured second computing device 130 (414). The secured first computing device 120 transmits an authorization to dispense indicia of credit to the appropriate gaming ticket printer associated with the gaming device or patron location directly or via the cooperative host system (415). In the latter embodiment, the cooperative host system then transmits the authorization to a credit system 105*a*, 105*b*, or 105*c* and associated ticket printer 106, 107, or 108, respectively, that are associated with the originating electronic transaction terminal, and the printer prints a ticket with the requested amount of game play credits (416). The patron receives the printed ticket with the credited funds and uses it in the gaming device or cashes it out (417). In an embodiment suitable for a table game, the system provides an immediate system redeemed voucher that is provided directly to the dealer or other authorized gaming or amusement personnel for conversion into gaming chips in lieu of a conventional ticket being provided directly to the patron.

A typical network connection between secured first computing device 120 and the external web services is HTTPS/TCP/IP over the public Internet. Other examples of physical networks supported include, GSM, iDEN, D-AMPS, cdmaOne, PDC, CSD, PHS, GPRS, HSCSD, WiDEN, CDMA2000 1×RTT, EDGE, W-CDMA, UMTS, FOMA, CDMA2000 1×EV, TD-SCDMA, UMA, HSUPA, HSUPA, SONET, Ethernet, Ethernet V2, X.21, and ISDN among others.

Other implementations of the invention may replace the SOAP 2100 with Action Script Message Format (AMF) 2200 or SMAP 2300. SOAP interface 2100 is one of the potential mechanisms by which the player and server communicate. Only one of 2100, 2200 or 2300 is used in any player deployment. SOAP is an object oriented Remote Procedure Call (RPC) formatted in XML. AMF 2200 is another communication protocol, currently favored by Macromedia Flash. SMAP 2300 is a communication protocol proprietary to Way Systems that includes transport layer and application layer functionality (i.e., authentication).

Several embodiments of the present invention have been described. Nevertheless, it will be understood that various modifications may be made without departing from the spirit and scope of the invention. Accordingly, other embodiments are within the scope systems and methods taught herein.

What is claimed is:

1. A method of purchasing authorized credits, the method comprising:
using one of a plurality of electronic transaction terminals to provide an electronic transaction request instruction, each of the plurality of electronic transaction terminals include a handheld device configured to receive a patron input, the handheld device including a display, wherein each of the plurality of electronic transaction terminals is located at an activity table, and wherein each of the plurality of electronic transaction terminals is in secured electronic communication with a computing device;
generating an electronic transaction request for an electronic transaction using the electronic transaction request instruction:
securely communicating the electronic transaction request from the computing device to a financial account server via a financial account network;
securely receiving, at the computing device, an electronic transaction approval from the financial account server via the financial account network;
generating, by the computing device, an authorization to dispense authorized credits to a patron;
securely communicating the authorization to dispense authorized credits from the computing device to a credit system, the credit system associated with the activity table and the electronic transaction terminal that provided the electronic transaction request instruction;
generating, by the computing device, a non-negotiable voucher;
generating, by the computing device, a receipt; and
receiving, by the patron located at the activity table, said authorized credits associated with the credit system.

2. The method of claim 1 wherein each of the plurality of electronic transaction terminals further include at least one member of the group consisting of a payment card industry (PCI) device, a PIN entry device (PED), a chip-and-PIN (EMV) device, a point-of-sale (POS) personal identification number (PIN) entry keypad, a payment card reader, a smart card reader, a magnetic card reader, a chip-and-PIN (EMV) card reader, a contactless card reader, a contactless proximity card reader, a display, a network connectivity module, a secure mobile application, a secure client-side application, and a secure electronic transaction application.

3. The method of claim 1 wherein providing electronic transaction request instructions further comprises:
inserting a payment card into the one electronic transaction terminal of the plurality of electronic transaction terminals;
selecting a payment transaction type;
selecting a financial account; and
entering a personal identification number (PIN).

4. The method of claim 1 further comprising:
generating, by the one electronic transaction terminal of the plurality of electronic transaction terminals, the electronic transaction request; and
securely communicating, by the one electronic transaction terminal of the plurality of electronic transaction terminals, the electronic transaction request, to the computing device associated with the one electronic transaction terminal of the plurality of electronic transaction terminals.

5. The method of claim 1 further comprising:
securely communicating the electronic transaction request instructions from the one electronic transaction terminal of the plurality of electronic transaction terminals to the computing device associated with the one electronic transaction terminal; and
generating, by the computing device associated with the one electronic transaction terminal, the electronic transaction request.

6. The method of claim 1 wherein each of the plurality of electronic transaction terminals further include a tabletop device configured to receive patron input, the tabletop device including a display.

7. The method of claim 1 further comprising a second computing device, the second computing device including a database,
said second computing device separate from an in secured electronic communication with the computing device;
said second computing device configured to receive confirmation of the transaction approval from the computing device; and
said second computing device further configured to provide accounting and reconciliation of all electronic transactions and of all authorizations to dispense authorized credits to the patron.

8. A system for purchasing authorized credits comprising:
a plurality of electronic transaction terminals, in which each electronic transaction terminal includes a handheld device configured to receive a patron input, the handheld device including a display, wherein each electronic transaction terminal is configured to generate an electronic transaction request instruction;
each of the plurality of electronic transaction terminals located at an activity table;
each of the plurality of electronic transaction terminals in secured electronic communication with a computing device;
an electronic transaction request generated for an electronic transaction with the electronic transaction request instruction, wherein the electronic transaction request is securely communicated from the computing device to a financial account server via a financial account network;
an electronic transaction approval that is securely received at the computing device, wherein the received electronic transaction approval is from the financial account server via the financial account network;
an authorization to dispense authorized credits to a patron generated by the computed device;
the computing device configured to generate a non-negotiable voucher when an authorization is received;
the computing device further configured to generate a receipt when a non-negotiable voucher is generated;
a credit system associated with the activity table and the electronic transaction terminal that provided the electronic transaction request instruction, wherein the authorization to dispense authorized credits is securely communicated from the computing device to the credit system; and
wherein the patron located at the activity table receives the authorized credits associated with the credit system.

9. The system of claim 8 wherein all communications between each of the plurality of electronic transaction terminals and the financial account network pass through the computing device.

10. The system of claim 8 wherein all communications between the computing device and the second credit system are not accessible to any of the plurality of electronic transaction terminals.

11. The system of claim 9 wherein all communications between the computing device and the second credit system are not accessible to any of the plurality of electronic transaction terminals.

12. The system of claim 8 further comprising a second computing device including a database,
said second computing device separate from and in secured electronic communication with the computing device;

said second computing device configured to receive confirmation of the transaction approval from the computing device; and said second computing device further configured to provide accounting and reconciliation of all electronic transactions and of all authorizations to dispense authorized credits to the patron.

13. The system of claim 8 wherein each of the electronic transaction terminals does not dispense authorized credits associated with the second credit system.

14. The system of claim 8 wherein each of the plurality of electronic transaction terminals further comprises at least one member selected from the group consisting of a Payment Card Industry (PCI) device, a PIN entry device (PED), a chip-and-PIN (EMV) device, a point-of-sale (POS) personal identification number (PIN) entry keypad, a payment card reader, a display, a network connectivity module, a secure mobile application, a secure client-side application, and a secure electronic transaction application.

15. The system of claim 14 wherein the payment card reader includes at least one of a smart card reader, a magnetic card reader, a chip-and-PIN (EMV) card reader, a contactless card reader and a contactless proximity card reader.

16. The system of claim 8 wherein the computing device is further configured to communicate confirmation and denial of the electronic transaction request to at least one of the plurality of electronic transaction terminals, and wherein each of the electronic transaction terminals is further configured to receive from the computing device the communication of confirmation and denial of the electronic transaction request; and each of the electronic transaction terminals is further configured to display to the patron the confirmation and denial of the electronic transaction request.

17. The system of claim 8 wherein the at least one financial account network comprises at least one member selected from the group consisting of PLUS, STAR, STAR Preferred, CIRRUS, INTERLINK, MONEY PASS, NYCE, Jeanie, Jeanie Preferred, Interlink, Interlink business, PAVD, PAVD Business, Alaska Option, Armed Forces Financial Network, NetWorks, Pulse, Pulse Preferred, Pulse Limited, Shazam, Maestro, Credit Union 24, ACCEL, ACCEL Preferred, ATH Network, and NYCE Preferred networks.

18. The system of claim 8 wherein each of the plurality of electronic transaction terminals include a tabletop device configured to receive patron input, wherein the tabletop device including a display.

* * * * *